United States Patent
Hong et al.

(10) Patent No.: US 10,420,067 B2
(45) Date of Patent: Sep. 17, 2019

(54) METHOD OF CHANGING CONNECTION STATE AND APPARATUS THEREFOR

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/498,607

(22) Filed: Apr. 27, 2017

(65) Prior Publication Data

US 2017/0325281 A1  Nov. 9, 2017

(30) Foreign Application Priority Data

May 3, 2016  (KR) .......... 10-2016-0054935
Apr. 5, 2017  (KR) .......... 10-2017-0044062

(51) Int. Cl.
| | |
|---|---|
| *H04W 28/02* | (2009.01) |
| *H04W 76/20* | (2018.01) |
| *H04W 68/02* | (2009.01) |
| *H04W 72/04* | (2009.01) |
| *H04W 76/27* | (2018.01) |
| *H04W 76/34* | (2018.01) |

(52) U.S. Cl.
CPC ......... *H04W 68/02* (2013.01); *H04W 72/048* (2013.01); *H04W 76/27* (2018.02); *H04W 76/34* (2018.02)

(58) Field of Classification Search
CPC ................................................. H04W 4/00–06
See application file for complete search history.

(56) References Cited

U.S. PATENT DOCUMENTS

| | | | | |
|---|---|---|---|---|
| 2014/0321371 A1* | 10/2014 | Anderson | ........... | H04W 76/028 370/329 |
| 2015/0223284 A1* | 8/2015 | Jain | ......... | H04W 4/70 370/329 |
| 2015/0327327 A1* | 11/2015 | Jain | ........ | H04W 76/38 370/328 |

(Continued)

OTHER PUBLICATIONS

3GPP, TR 23.799 V0.4.0, "3rd Generation Partnership Project; Technical Specification Group Services and System Aspects; Study on Architecture for Next Generation System (Release 14)", Apr. 27, 2016, pp. 1-96.

(Continued)

*Primary Examiner* — San Htun
(74) *Attorney, Agent, or Firm* — IP Legal Services, LLC

(57) ABSTRACT

Disclosed are a control plane signaling method and apparatus for reducing signaling according to a state change of a UE, and a method of efficiently changing a UE connection UE in a wireless network without movement or a state transition change of a UE in a core network. A method of changing a connection state by a UE includes: transmitting UE capability information indicating that the UE supports a light connection to an eNB; receiving a Radio Resource Control (RRC) message including indication information indicating a state change to a light connection state from the eNB; and changing a connection state of the UE from an RRC-connected state to the light connection state based on the indication information.

11 Claims, 7 Drawing Sheets

(56) References Cited

U.S. PATENT DOCUMENTS

2016/0057797 A1* 2/2016 Bangolae .......... H04W 52/0209
370/311
2016/0234877 A1* 8/2016 Bangolae ............ H04W 76/046
2018/0041925 A1* 2/2018 Yilmaz ............. H04W 36/0033

OTHER PUBLICATIONS

Nokia, "Solution: Mobility Options", S2-161625, 3GPP TSG SA WG2 Meeting #S2-114, Sophia Antipolis, FR, Apr. 11-15, 2016, pp. 1-5.

* cited by examiner

METHOD OF CHANGING CONNECTION STATE AND APPARATUS THEREFOR

CROSS REFERENCE TO RELATED APPLICATION

This application claims priority from Korean Patent Application Nos. 10-2016-0054935 & 10-2017-0044062, filed on May 3, 2016 & Apr. 5, 2017, which are hereby incorporated by reference for all purposes as if fully set forth herein.

BACKGROUND OF THE INVENTION

1. Field of the Invention

The present disclosure relates to a control plane signaling method and apparatus for reducing signaling according to a User Equipment (UE) state change, and a method of efficiently changing a UE connection state in a wireless network without movement of a UE or change in a state transition of a UE in a core network.

2. Description of the Prior Art

As communication systems have developed, various types of wireless terminals have been introduced to consumers, such as companies and individuals. A current mobile communication system has affiliated with 3rd generation partnership project (3GPP), for example, Long Term Evolution (LTE), LTE-Advanced (LTE-A), and the like. Such a current mobile communication system is a high-speed and high-capacity communication system capable of transmitting and receiving various kinds of data, such as image data, wireless data, and the like, at a high speed. Accordingly, there is demand for technology for transmitting a large amount of data at a high speed as fast as a speed of a wired communication network.

Further, due to abrupt increment of machine-type communication (MTC) User Equipments (UEs) in a number, data transmission and reception through mobile communication systems have rapidly increased. Meanwhile, such a MTC periodically transmits and receives a small amount of data, and further, a low-power low-cost UE may be commonly used as the MTC UE.

Accordingly, there is a demand for technology for enabling a plurality of UEs to transmit and receive data with low power consumption.

Particularly, a UE that periodically or aperiodically transmits a small amount of data is required to change an RRC connection state to transmit the small amount of data. However, to change the RRC connection state through the typical method, a very complicated procedure for data transmission/reception is performed between the UE and an evolved Node B (eNB) and between the eNB and a core network.

Such a complicated transmission/reception procedure causes a relatively high data load compared to the small amount of data that the UE desires to transmit. That is, during the procedure for changing the RRC-connected state to transmit a small amount of data, unnecessary data overload may be generated.

This problem may cause increasing the data load of the entire communication system as the number of UEs periodically transmitting a small amount of data increases.

Accordingly, it is required to develop a detailed method and procedure for changing a UE connection state to transmit and receive a small amount of data without seriously increasing the data overload of the entire communication system according to a change in a wireless communication environment.

SUMMARY OF THE INVENTION

In the above-described background, an embodiment proposes a method and an apparatus for implementing quick data transmission and reception while reducing the load of the entire communication system through the addition of a connection state of the UE, such as a light connection state, to an RRC-connected state and an RRC idle state.

Further, another embodiment proposes a detailed procedure for performing the transition of a connection state of the UE including a light connection state.

In accordance with an aspect of the present disclosure, a method of changing a connection state by a user equipment (UE) is provided. The method includes: transmitting UE capability information indicating that the UE supports a light connection to an eNB; receiving a Radio Resource Control (RRC) message including indication information indicating a state change to a light connection state from the eNB; and changing a connection state of the UE from an RRC-connected state to the light connection state based on the indication information.

In accordance with another aspect of the present disclosure, a method of changing the connection state of a UE by an eNB is provided. The method includes: receiving UE capability information indicating that the UE supports a light connection state from the UE; transmitting a Radio Resource Control (RRC) message including indication information indicating a state change to a light connection state to the UE; and changing a connection state with the UE from an RRC-connected state to the light connection state, wherein the light connection state corresponds to the state in which a connection state between the eNB and a core network for the UE is maintained but all SRBs (Signaling Radio Bearers) and DRBs (Data Radio Bearers) are suspended.

In accordance with another aspect of the present disclosure, a UE changing a connection state is provided. The UE includes: a transmitter configured to transmit UE capability information indicating support of a light connection to an eNB; a receiver configured to receive an RRC message including indication information indicating a state change to a light connection state from the eNB; and a controller configured to change a connection state of the UE from an RRC-connected state to the light connection state.

In accordance with another aspect of the present disclosure, an eNB changing a connection state of a UE is provided. The eNB includes: a receiver configured to receive UE capability information indicating that the UE supports a light connection state from the UE; a transmitter configured to transmit an RRC message including indication information indicating a state change to the light connection state to the UE; and a controller configured to change a connection state with the UE from an RRC-connected state to the light connection state, wherein the light connection state corresponds to the state in which a connection state between the eNB and a core network for the UE is maintained but all SRBs (Signaling Radio Bearers) and DRBs (Data Radio Bearers) are suspended.

The above-described present embodiments provide reduced signaling procedures for the UE performing frequency connection state changes, to provide an effect of reducing the data load of the entire communication system.

Further, the present embodiments provide a reduction in data load by quickly changing a UE connection state and decreasing core network signaling.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
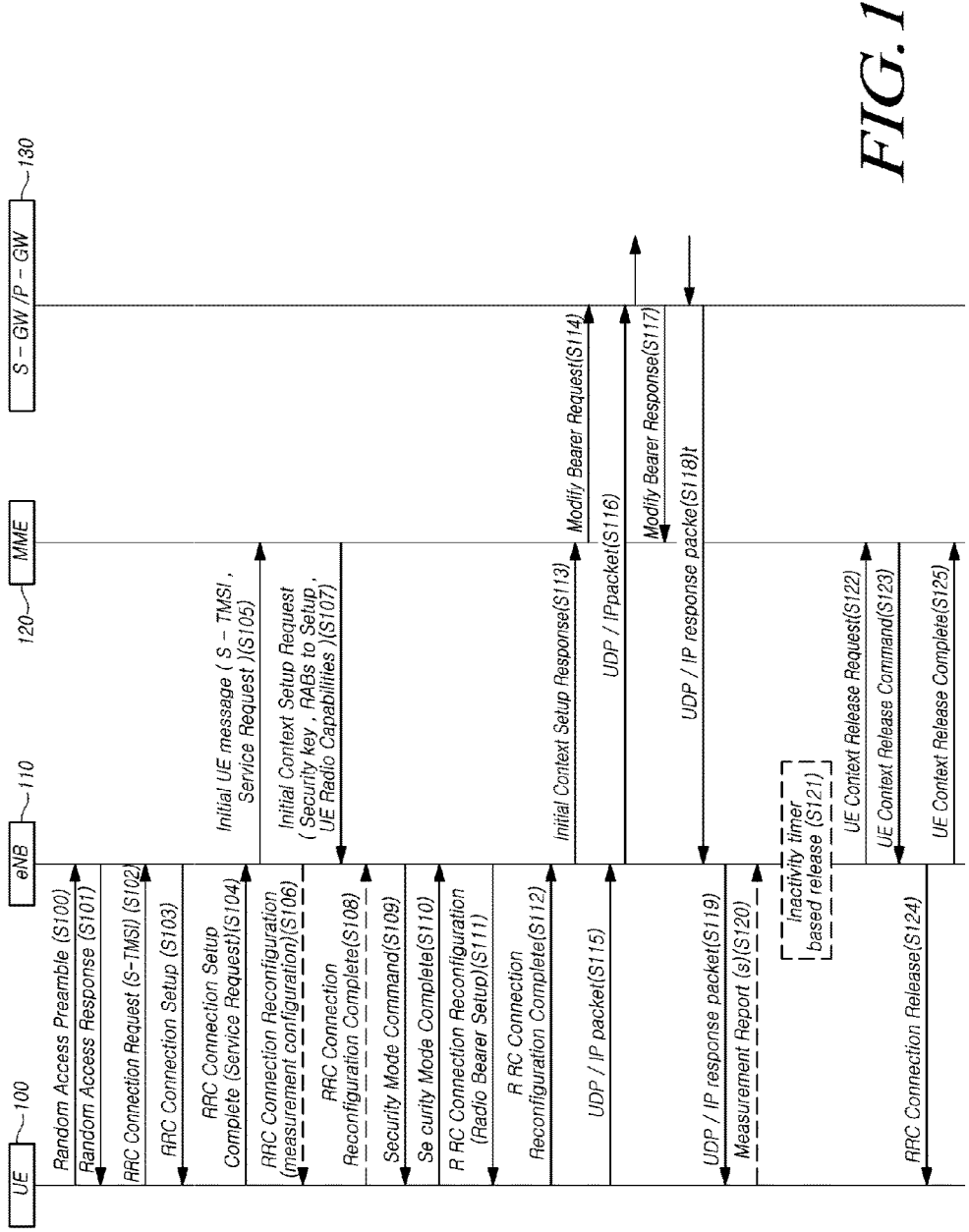
FIG. 1 illustrates an exemplary detailed procedure for changing a typical UE connection state.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, a MTC terminal refers to a terminal that is low cost (or is not very complexity), a terminal that supports coverage enhancement, or the like. In the present specifications, the MTC terminal refers to a terminal that supports low cost (or low complexity) and coverage enhancement. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed to provide various types of communication services, such as a voice service, a packet data service, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in WCDMA, LTE, high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed. The base station or the cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell, and thus, the base station may be construed in two ways. i) the base station may be a device itself that provides a megacell, a macrocell, a microcell, a picocell, a femtocell, and a small cell in association with a wireless area, or ii) the base station may indicate a wireless area itself. In i), all devices that interact with one another to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. In ii), a wireless area itself that receives a signal from or transmits a signal took a perspective of a terminal or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and the user equipment and the base station may not be limited to a predetermined term or word. In the specification, the user equipment and the base station are used as two (uplink or downlink) inclusive transceiving subjects to embody the technology and technical concepts described in the specifications, and the user equipment and the base station may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields in which the technical idea of the present disclosure is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, so as to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

Connection State Transition Procedure of UE

In typical mobile communication technology, states of a UE and a network are divided into a UE idle state and a connected state. The states of the UE and the network match each other. For example, states (for example, an RRC state and an ECM state) in a wireless network (E-UTRAN) and a core network match each other. That is, when the corresponding UE transitions to an RRC-IDLE state, the network enters an ECM-IDLE state. When the corresponding UE transitions an RRC-CONNECTED state, the network enters an ECM-CONNECTED state. When the UE in the idle state transmits data, a complicated signaling process illustrated in FIG. 1 should be performed depending on the state of the corresponding UE. Particularly, when the UE transmits a small amount of data, a large overhead is generated.

FIG. 1 illustrates an exemplary detailed procedure for changing a typical UE connection state.

Referring to FIG. 1, a UE 100 transmits a random-access preamble to an eNB 110 to transition from the RRC idle state to the RRC-connected state and transmit data in S100. Thereafter, the UE 100 receives a random-access response from the eNB 110 in S101 and makes a request for an RRC connection reconfiguration to the eNB 110 in S102.

The eNB 110 establishes an RRC connection setup in the UE 100 in S103, and the UE 100 reports the completion in S104.

When the RRC connection setup in the UE 100 is completed, the eNB 110 makes a request for service by transmitting an initial UE message to an MME 120 in S105. The MME 120 makes a request for an initial context setup to the eNB 110 in S107. In S106, the eNB 110 may establish a measurement configuration by transmitting an RRC reconfiguration message to the UE 100 between steps S105 and S107. When the measurement configuration is completed, the UE 100 transmits the RRC connection reconfiguration message to the eNB 110 in S108.

The eNB 110 transmits a security mode command to the UE 100 in S109 and receives a response thereto in S110.

Thereafter, the eNB 110 transmits the RRC connection reconfiguration message for a radio bearer setup to the UE 100 in S111 and receives a response thereto in S112. The eNB 110 transmits a response to the initial context setup to the MME 120 in S113, and the MME 120 transmits a bearer modification request to a gateway 130 in S114.

The UE 100 transmits a UDP/IP packet to the eNB 110 in S115, and the eNB 110 transmits the corresponding packet to the gateway 130 in S116. The gateway 130 transmits a response to the bearer modification to the MME 120 in S117, and the gateway 130 transmits a UDP/IP packet response to the eNB 110 in S118. The eNB 110 transmits the corresponding packet to the UE 100 in S119.

Through this procedure, the UE 100 transmits the packet to the core network.

Thereafter, the UE 100 transmits a measurement report to the eNB 120 according to the measurement configuration, either periodically or when an event is generated in S120. The eNB 120 determines whether to release the UE 100 based on the measurement report or an inactive timer in S121. When the RRC connection release of the UE 100 is determined, the eNB 110 makes a request for releasing a UE context to the MME 120 in S122. The MME 120 transmits a UE context release command to the eNB 110 in S123, and the eNB 110 instructs the UE 100 to release the RRC connection in S124.

After releasing the RRC connection of the UE 100, the eNB 110 transmits a response to the MME 120 in S125.

Through this procedure, the RRC-connected UE may transition to the RRC idle state.

As described above, in the typical arts, for the transition of the UE from the RRC idle state to the RRC-connected state or from the RRC-connected state to the RRC idle state, a plurality of signaling procedures are needed between the UE and the eNB and between the eNB and the core network. In the procedures, when the UE periodically transmits a small amount of data, overhead may be continuously generated. Meanwhile, to reduce the overhead according to the state transition, the UE may remain in the connected state. However, in this case, even though there is no data transmission, a network state should be periodically measured according to a measurement configuration and a measurement result should be reported, which causes unnecessary power consumption. Further, when the RRC-connected state is maintained, handover signaling overhead due to movement of the UE may increase.

Connection State Transition Procedure for NB-IoT UE

A narrow band Internet of Thing (IoT) UE may be operated in a fixed state. The narrow band IoT UE may be installed at a particular location or located within a particular range. Due to such a characteristic, the NB-IoT UE and the eNB support a suspend/resume procedure. In an RRC connection release message, the eNB may make a request for maintaining an AS context to the UE in an RRC_IDLE state. When the UE receives the RRC connection release message including RRC suspend information and transitions to the RRC IDLE state (or before the eNB transmits the message to the UE), the eNB transmits an S1 message that makes a request for the state transition of the corresponding UE to the core network and enters the ECM IDLE state.

The RRC connection resume procedure is used for a transition from the RRC IDLE state to the RRC-connected state to use the information previously stored by the UE and the eNB for resuming the RRC connection. When the UE resumes the RRC connection resume procedure and transitions to the RRC-connected state (after the eNB transmits the RRC connection resume message to the UE), the eNB transmits the S1 message that makes a request for state transition of the corresponding UE to the core network and enters the ECM-connected state.

However, in this case, the RRC-connected state and the ECM-connected state are equally made and, accordingly, unnecessary overhead may occur between the eNB and the core network. That is, as described above, the typical mobile communication technology had a signaling overhead problem due to the state transition, and the suspend/resume procedure for the UE at the fixed location to reduce the problem could be applied only to the NB-IoT UE. Accordingly, when the UE escapes from a cell (or eNB) for which an AS context has been previously provided, the UE should resume a service request procedure as illustrated in FIG. 1 to transmit uplink data. Further, since the transition of the UE between the suspend state and the resume state is the same as the transition between the IDLE state and the CONNECTED state, core network signaling (S1 signaling) is continuously generated.

To solve the problem, a detailed procedure for transitioning only a wireless network connection state without core network signaling is proposed.

In the typical arts, the UE and the eNB generated the wireless network connection state transition based on signaling and user data created in a higher layer of AS (Access Stratum) (for example, Non-Access Stratum, IP, GTP, or the like), so that a detailed operation procedure is required in order to transition only the wireless network connection state without core network signaling.

Further, when only the wireless connection state transitions without core network signaling, incoming data for the corresponding UE may not be properly received. In order to solve the problem, a method of triggering paging in the wireless network by itself may be considered, but a detailed method thereof has not been proposed either. Particularly, paging according to the typical art is triggered through the core network. Accordingly, a method of triggering paging in the wireless network may have a problem in that a paging function triggered through the core network may not be sufficiently provided.

An aspect of the present embodiment made to solve the above-described problems is to provide a method and an apparatus for transmitting/receiving data by effectively performing wireless network state transition without core network signaling in order to reduce core network signaling overhead.

Embodiments described below may be applied to UEs using all mobile communication technologies. For example, the present embodiments may also be applied to a next-generation mobile communication (for example, 5G mobile communication) UE as well as the mobile communication UE to which the LTE technology is applied. For convenience of description, the eNB may denote an eNode-B of LET/E-UTRAN or an eNB (an entity implemented by a CU or a DU, or one logical entity implemented by the CU and the DU) in a 5H wireless network in which the CU (Central Unit) and the DU (Distribute Unit) are separated.

Method of Performing Wireless Network State Transition without Core Network Signaling In order to reduce signaling attributable to state transition of the UE, the eNB may support performance of some or all operations (for example, one or more operations of cell reselection, paging, radio resource release/use stop/suspend, and maintaining/waiting for some radio resources) of the UE in the RRC idle state to make the UE consume UE power similar to that in the RRC idle state in the state in which the connection between the eNB and the core network for the UE (for example, an S1 connection in LTE or an interface connection between the eNB and the core network entity in 5G) is maintained.

For convenience of description, in this specification, a state for performing some or all operations in the RRC idle state is referred to as a light connection state in the state in which a control plane connection or a user plane connection is maintained on the eNB and the core network interface for the UE. The light connection state may be called as various terms such as a new RRC state, a sub state of an RRC connection, a UE mobility provision connection state, a wireless network paging state, a connection standby state, an RRC idle state maintaining an S1 connection, an RRC idle state maintaining a core network connection, and an S1 connection standby state, but there is no limitation in the name thereof.

Further, in the light connection state, when the eNB instructs the RRC-connected UE to switch to the light connection state, a UE context release request message may not be transmitted to the core network. That is, signaling for releasing the connection on the interface between the core network and the eNB may not be performed. Alternatively, the (S1) connection on the interface between the core network and the eNB may be maintained. For reference, in the typical art, when the eNB release the RRC connection state of the UE, the eNB transmits a UE context release request message to the MME to make a request for releasing the logical S1 connection made with the UE.

As described above, this specification describes a newly defined connection state of the UE as the light connection state, but the above-described light connection state corresponds only to an example indicating the state in which the UE performs some operations in the RRC idle state while the connection between the eNB and the core network for the UE is maintained, and the present disclosure is not limited thereto.

Hereinafter, a method of transitioning to the light connection state of the UE according to the present embodiment will be described in detail.

Figure 2:
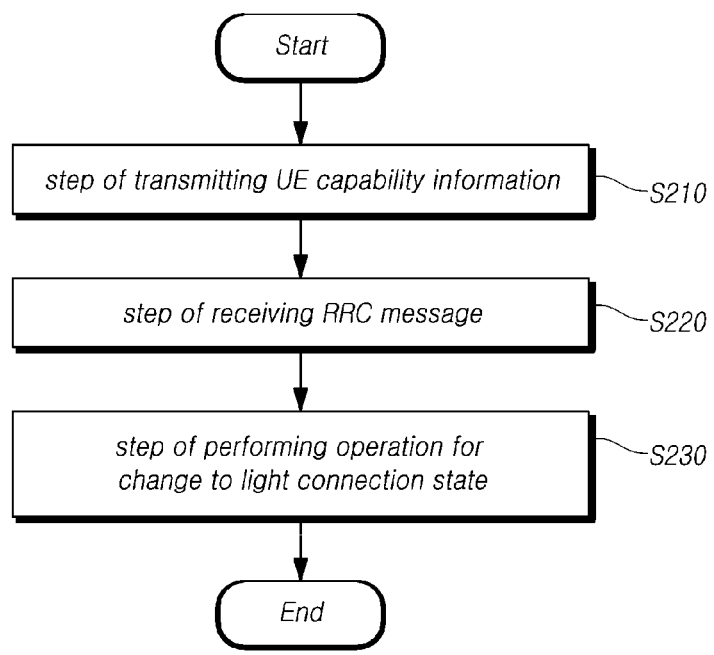
FIG. 2 is a flowchart illustrating a UE operation according to an embodiment.

FIG. 2 is a flowchart illustrating a UE operation according to an embodiment.

Referring to FIG. 2, the UE performs an operation of transmitting UE capability information indicating that the UE supports a light connection to the eNB in S210. For example, the UE may transmit information on whether the corresponding UE supports a light connection state to the eNB. That is, the UE may transmit information indicating support of an RRC connection state, an RRC idle state, and a light connection state to the eNB.

For example, the UE capability information may be transmitted to the eNB or the core network through AS capability or NAS capability. In another example, the UE capability information may be included in UE radio access capability or UE core network capability.

The UE may transmit the UE capability information to the eNB through RRC signaling.

The light connection state refers to the state in which a connection between the eNB and the core network for the UE is maintained but all Signaling Radio Bearers (SRBs) and Data Radio Bearers (DRBs) of the UE are suspended. That is, the light connection state may correspond to the state in which the RRC state and the ECM state do not match.

The UE performs an operation of receiving an RRC message including indication information indicating a state change into the light connection state from the eNB in S220. For example, the RRC message may be an RRC connection reconfiguration message or an RRC connection release message. Alternatively, the indication information may be included in a newly defined RRC message.

The UE performs an operation for changing the connection state of the UE from the RRC-connected state to the light connection state based on the indication information in S230. For example, when the indication information indicating the state change into the light connection state is received from the eNB, the UE suspends all the SRBs and the DRBs for the corresponding eNB. However, unlike the RRC idle state, the UE may store a UE context. In this case, the eNB also stores a UE context for the corresponding UE. Accordingly, when the light connection state of the UE is transited to the RRC-connected state, the UE and the eNB may use the stored UE context again to perform quick data transmission/reception.

In addition, when the UE in the light connection state moves, the UE may perform a cell re-selection operation rather than handover. That is, since the RRC connection of the UE is similar to a state of being released from the eNB, the UE may perform the cell re-selection procedure when the UE moves.

Figure 3:
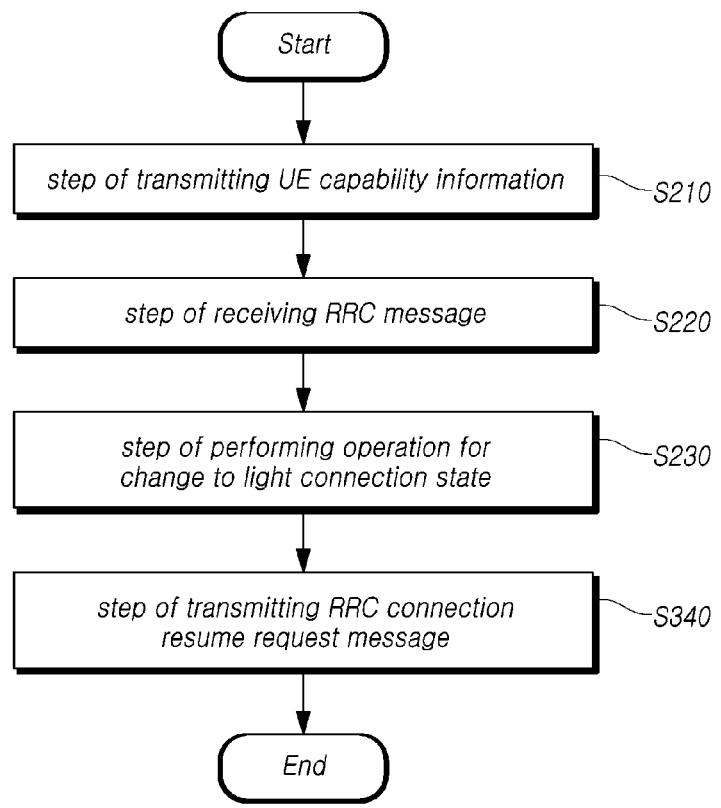
FIG. 3 is a flowchart illustrating a UE operation according to another embodiment.

FIG. 3 is a flowchart illustrating a UE operation according to another embodiment.

Referring to FIG. 3, in the state where the UE transitions to the light connection state through steps S210 to S230, the UE may change back to the RRC-connected state.

To this end, the UE may transmit an RRC connection resume request message to the eNB in S340. For example, when the transition of the UE in the light connection state to the RRC-connected state is triggered, the UE may transmit the RRC connection resume request message to the eNB and perform a transition operation from the light connection state to the RRC-connected state.

For example, the state change into the RRC-connected state may be triggered by one operation of paging message reception, outgoing data trigger, and outgoing signaling trigger. More specifically, when the paging message for the UE in the light connection state is received, the UE may perform the transition operation to the RRC-connected state. Alternatively, when outgoing data which the UE in the light connection state will transmit to the eNB is triggered, the UE may perform the transition operation to the RRC-connected state. Alternatively, when outgoing signaling which the UE in the light connection state will transmit to the eNB is triggered, the UE may perform the transition operation to the RRC-connected state.

Meanwhile, the RRC connection resume request message may include cause information indicating a trigger cause of the state change to the RRC-connected state. The cause information indicating the trigger cause may include information on whether the cause is the above-described paging, outgoing data trigger, or outgoing signaling trigger.

Figure 4:
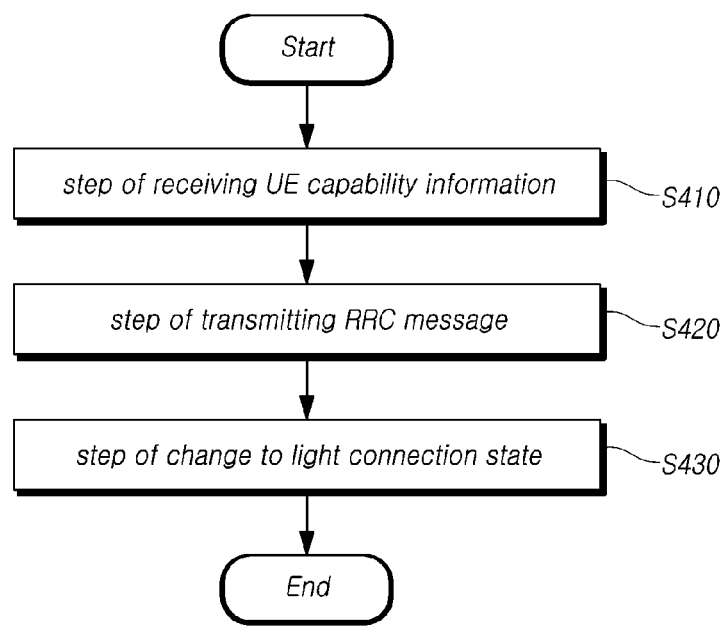
FIG. 4 is a flowchart illustrating an eNB operation according to an embodiment.

FIG. 4 is a flowchart illustrating an eNB operation according to an embodiment.

Referring to FIG. 4, the eNB performs an operation of receiving UE capability information indicating that the UE supports a light connection state from the UE in S410. The eNB may receive the UE capability information from the UE, to identify that the corresponding UE supports an RRC-connected state, an RRC idle state, and a light connection state.

For example, the UE capability information may be transmitted to the eNB or the core network through AS capability or NAS capability. In another example, the UE capability information may be included in UE radio access capability or UE core network capability. The eNB may receive the UE capability information through RRC signaling.

As described above, the light connection state may refer to the state in which a connection state between the eNB and the core network for the UE is maintained but all SRBs and DRBs of the UE are suspended.

The eNB may perform an operation of transmitting an RRC message including an indication message indicating a state change to the light connection state to the UE in S420. The eNB may transmit the RRC message to make the UE transition to the light connection state. For example, the RRC message may be an RRC connection reconfiguration message or an RRC connection release message. Alternatively, the indication information may be included in a newly defined RRC message.

The eNB may perform an operation of changing the connection state with the UE from the RRC-connected state to the light connection state in S430. When the UE transitions to the light connection state, the eNB may suspend all the SRBs and the DRBs for the corresponding UE. However, unlike the RRC idle state, the eNB may store a UE context of the corresponding UE. Accordingly, when the light connection state of the UE is transited to the RRC-connected state, the UE and the eNB may use the stored UE context again to perform quick data transmission/reception.

The eNB may also control the transition of the UE in the light connection state to the RRC-connected state. This will be described with reference to FIG. 5 below.

Figure 5:
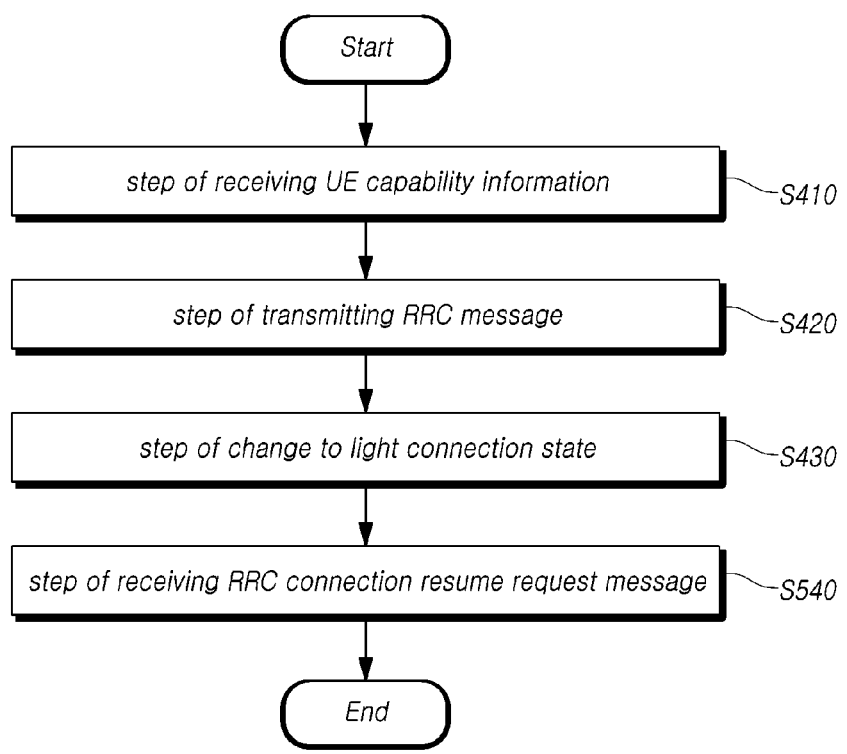
FIG. 5 is a flowchart illustrating an eNB operation according to another embodiment.

FIG. 5 is a flowchart illustrating an eNB operation according to another embodiment.

Referring to FIG. 5, the eNB may make the UE transition to the light connection state through steps S410 to S430. Thereafter, the eNB may make the corresponding UE transition back to the RRC-connected state.

For example, the eNB may receive an RRC connection resume request message that makes a request for a state change from the light connection state to the RRC-connected state from the UE in S540. For example, when the transition of the UE in the light connected state to the RRC-connected state is triggered, the eNB may receive the RRC connection resume request message and perform an RRC-connected state transition operation of the corresponding UE.

For example, the state change into the RRC-connected state may be triggered by one operation of paging message reception of the UE, outgoing date trigger, and outgoing signaling trigger. More specifically, when the paging message for the UE in the light connection state is transmitted, the UE may perform the transition operation to the RRC-connected state. Alternatively, when outgoing data which the UE in the light connection state will transmit to the eNB is triggered, the UE may perform the transition operation to the RRC-connected state. Alternatively, when outgoing signaling which the UE in the light connection state will transmit to the eNB is triggered, the UE may perform the transition operation to the RRC-connected state.

Meanwhile, the RRC connection resume request message may include cause information indicating the trigger cause of the state change to the RRC-connected state. The cause information indicating the trigger cause may include information on whether the cause is the above-described paging, outgoing data trigger, or outgoing signaling trigger.

The orders of the steps of FIG. 2 to FIG. 5 described above may be changed, or some steps may be omitted or added.

Hereinafter, various embodiments of the individual step operation of the present embodiments described with reference to FIG. 2 to FIG. 5 will be described.

Embodiment for Transmitting Information on Whether UE Supports Light Connection

To provide a proper configuration to the UE, the eNB should accurately recognize UE (hereinafter, referred to as a UE or a terminal, which refers to a 5G UE as well as an LTE UE for convenience of description) capability. RRC signaling delivers AS capabilities and NAS signaling delivers NAS capabilities. A core network control plane entity (for example, MME, hereinafter, the core network control plane entity being represented by the MME) stores UE capabilities (or UE capability including UE Radio Access Capability and UE Core Network Capability).

For example, UE Core Network Capability may be indicated through NAS signaling (an attach procedure) by the UE. In another example, UE Radio Access Capability may be transmitted from the UE to the eNB based on a UE capability transfer procedure through an S1 interface. In another example, UE Radio Access Capability may be indicated to the MME through NAS signaling (an attach procedure) by the UE and transmitted to the eNB through the S1 interface.

When the MME is available, the MME transmits UE Radio Access Capability to the eNB whenever the UE enters the RRC-connected state. For example, the MME may transmit UE radio capability to the eNB through an S1 Initial context setup request message.

The eNB may make a request for UE capability information to the UE if necessary. For example, after the completion of handover, the eNB may acquire UE capability information from the UE through the UE capability transfer procedure and then transmit the acquired UE capability information to the MME.

For example, information indicating the support of the light connection may be defined in the UE capability information (for example, UE radio capability information). In another example, the information indicating the support of the light connection may define information modified/expanded from the UE capability information for NB-IoT suspend/resume (or AS context caching).

The eNB may receive the information indicating that the UE supports the light connection through the above-described methods.

Embodiment of Light Connection Configuration

The eNB may indicate a light connection state to the UE through each or a combination of the following methods.

1) Indicate the Light Connection State by Defining a New Release Cause in an RRC Connection Release Message When the eNB recognizes that the UE supports the light connection, the eNB may transmit an RRC connection release message indicating the light connection as a release cause to the UE.

The UE having received the RRC connection release message indicating the light connection as the release cause may perform an operation for the light connection state.

The operation of the UE for the light connection state refers to one or more operations below.

store UE context store identification information of UE in light connection state perform some or all operations of RRC IDLE UE (for example, one or more operations of cell reselection, paging, and radio resource release/use stop/suspend)

1-1) Embodiment for Processing a Light Connection State without being Indicated to Higher Layer The UE having received the RRC connection release message indicating the light connection as the release cause may not indicate the light connection state to a higher layer to hide a state transition from the higher layer (NAS: Non-Access Stratum and/or user plane radio bearer higher layer). In this case, the higher layer cannot identify the light connection state.

For example, when outgoing data (MO data) to be transmitted is generated in the light connection state, it may be considered as the RRC-connected state and the data may be transmitted to a PDCP buffer mapped to the corresponding bearer. When a radio resource suspend operation is performed according to the light connection state switching and thus the PDCP entity is suspended, data transmission cannot be performed. Accordingly, when the UE having received the RRC connection release message indicating the light connection as the release cause does not indicate the light connection state to the higher layer, the PDCP should be maintained in the light connection state (or the PDCP should be maintained in the same state as the connected state). When data is received by the PDCP buffer, the transition to the RRC-connected state may be initiated. For example, when the PDCP entity receives a PDCP SDU in the light connection state, the UE may make a request for transition from the light connection state to the RRC-connected state.

In another example, when outgoing signaling (for example, MO signaling or NAS signaling) to be transmitted is generated in the light connection state, it may be considered as the RRC-connected state and a UL Information Transfer RRC message may be transmitted to the eNB. A UE RRC entity can know the light connection state, and thus initiate the transition to the RRC-connected state when outgoing signaling (MO signaling or NAS signaling) to be transmitted is generated.

1-2) Embodiment for Indicating Light Connection State to Higher Layer and Switching Only RRC Connection State The UE having received the RRC connection release message indicating the light connection as the release cause may indicate a light connection state to a higher layer. In this case, the higher layer may identify the light connection state.

For example, when outgoing data (MO data) to be transmitted is generated in the light connection state, a higher layer (for example, NAS) of the UE may not trigger a service request procedure. When outgoing data (MO data) is generated in the light connection state (pending data to be sent), the higher layer (for example, NAS) of the UE may indicate the transition from the light connection state to the RRC-connected state to a lower layer (for example, RRC). When receiving the indication of the transition from the light connection state to the RRC connection state from the higher layer, the RRC may initiate the transition from the light connection state to the RRC-connected state.

In another example, when outgoing signaling (for example, MO signaling or NAS signaling) to be transmitted is generated in the light connection state, the higher layer (for example, NAS) of the UE may not trigger a service request procedure. When outgoing signaling to be transmitted is generated in the light connection state, the higher layer (for example, NAS) of the UE may indicate the transition from the light connection state to the RRC-connected state to the lower layer (for example, RRC). When receiving the indication of the transition from the light connection state to the RRC-connected state from the higher layer, the RRC may initiate the transition from the light connection state to the RRC-connected state. That is, when receiving the indication of the transition from the light connection state to the RRC-connected state from the higher layer, the RRC may initiate the transition from the light connection state to the connected state.

When the UE receives the indication of the transition from the light connection state to the connected state from the higher layer and initiates the transition to the RRC-connected state, the UE is not required to transmit corresponding NAS signaling information (for example, indication of the transition to the light connection state) to the core network through the eNB.

1-3) Embodiment for Indicating a Light Connection State to a Higher Layer and Performing a Higher Layer Procedure The UE having received the RRC connection release message indicating the light connection as the release cause may indicate a light connection state to a higher layer. In this case, the higher layer may identify the light connection state.

For example, when outgoing data (MO data) to be transmitted is generated in the light connection state, a higher layer (for example, NAS) of the UE may trigger a service request procedure.

In another example, when outgoing data (MO data) to be transmitted is generated in the light connection state, the higher layer (for example, NAS) of the UE may trigger a NAS procedure (for example, an attach procedure or TAU procedure).

In another example, when outgoing data (MO data) to be transmitted is generated in the light connection state, the higher layer (for example, NAS) of the UE may trigger a new NAS procedure for the transition from the light connection state to the RRC-connected state.

When initiating the above-described NAS procedure (one of the service request procedure, the attach procedure, the TAU procedure, and the new NAS procedure) from the higher layer, the RRC of the UE may recognize the light connection state. Thus, the UE may perform the transition from the light connection state to the RRC-connected state. For example, the above-described NAS procedure may be performed between the UE and the core network entity. In another example, between the UE and the core network entity, only the transition to the RRC-connected state is performed without the NAS procedure. Then, the RRC may transmit a response to the NAS. For example, the UE may perform only the transition to the RRC-connected state and may not be required to transmit corresponding NAS signaling information (for example, indication of the transition to the light connection state) to the core network through the eNB.

2) Method of Defining Information Indicating Light Connection in RRC Connection Reconfiguration Message and Indicating Same When the eNB recognizes that the UE supports the light connection, the eNB may define information indicating the light connection in an RRC connection reconfiguration message and indicate it to the UE.

The UE having received the RRC connection reconfiguration message indicating the light connection may perform an operation for the light connection state.

The operation of the UE for the light connection state refers to one or more operations below.

store UE context store identification information of UE in light connection state perform some or all operations of RRC IDLE UE (for example, one or more operations of cell reselection, paging, and radio resource release/use stop/suspend)

Meanwhile, the eNB may include additional configuration information for indicating an additional detailed operation in the light connection state of the UE.

When the UE receives the RRC connection reconfiguration message indicating the light connection state and suspends radio resources according to indication information, the UE cannot transmit an RRC connection reconfiguration complete message to the eNB. For example, when an SRB for transmitting the RRC message is suspended, RRC signaling cannot be transmitted. Alternatively, when a MAC is reset or when radio configuration information of the corresponding cell is suspended, an RRC connection reconfiguration acknowledgement message cannot be transmitted to the eNB.

2-1) Embodiment of not Transmitting Reconfiguration Acknowledgement Message for RRC Connection Reconfiguration Message Indicating Light Connection For example, the UE having received the RRC connection reconfiguration message including the information indicating the light connection may not transmit the RRC connection reconfiguration acknowledgement message to the eNB.

2-2) Embodiment of Transmitting Reconfiguration Acknowledgement Message and Performing Transition to Light Connection when RRC Connection Reconfiguration Message Indicating Light Connection is Received For example, the UE having received the RRC connection reconfiguration message including the information indicating the light connection may first transmit the RRC connection reconfiguration acknowledgement message to the eNB and then apply the light connection.

2-3) Embodiment of Performing Transition to Light Connection Through New RRC Connection Configuration Message Separated from RRC Connection Reconfiguration Message For example, the information indicating the light connection may be received through a downlink RRC message separated from the RRC connection reconfiguration message. The downlink RRC message may be defined as a message that does not require a success or acknowledgement message. The UE may receive the downlink message and enter the light connection state.

The UE does not need to transmit an acknowledgement or failure message for the downlink RRC message.

2-4) Embodiment of Receiving RRC Connection Reconfiguration Message Indicating Light Connection and Supporting Some Communication Functions when Corresponding Operation is Applied For example, when the UE having received the RRC connection reconfiguration message including the information indicating the light connection transitions to the light connection state, a function (for example, maintaining L2 entity and MAC) for performing an operation of indicating the RRC connection reconfiguration acknowledgement message to the eNB may be maintained for a predetermined time or until a predetermined reference is met.

2-5) Embodiment of Receiving RRC Connection Reconfiguration Message Indicating Light Connection, Preparing Timer to be Used when Corresponding Operation is Applied, and Switching to Light Connection when Corresponding Timer Expires For example, the UE having received the RRC connection reconfiguration message including the information indicating the light connection may operate a timer for performing the transition to the light connection. When receiving the RRC connection reconfiguration message including the information indicating the light connection, the UE initiates the corresponding timer. When the timer expires, the transition to the light connection state is performed. The UE may transmit the RRC connection reconfiguration acknowledgement message to the eNB before the expiry of the corresponding timer, such that the corresponding timer does not expire.

Identification Information of UE in Light Connection State

As described above, the UE in the light connection state is not in the RRC-connected state. Thus, the UE does not perform a handover operation. Accordingly, the UE in the light connection state may perform a cell reselection operation according to movement of the UE.

To this end, even though the UE in the light connection state moves, the corresponding UE should be identified in the network. Further, to inquire/fetch/interrogate and process UE context for the corresponding UE when the UE moves, eNB identification information and/or cell identification information configured in the light connection state of the corresponding UE may be required.

As identification information of the UE in the light connection state, the following information may be used individually or together to effectively perform state transition and data transmission for the corresponding UE.

1) Store UE Identification Information of Core Network as UE Identification Information The UE identification information of the core network includes a core network entity code and identification information temporarily allocated by a core network entity. Accordingly, the UE may be uniquely identified within the corresponding core network entity.

2) Store Cell Identification Information and Wireless Network Temporary Identification Information as UE Identification Information When a cell within the network can be uniquely identified through cell identification information, the UE may be uniquely identified through a combination of the cell identification information and the wireless network temporary identification information temporarily allocated by the eNB accommodating the corresponding cell.

3) Store eNB Identification Information and Wireless Network Temporary Identification Information as UE Identification Information When an eNB within the network can be uniquely identified through eNB identification information, the UE may be uniquely identified through a combination of the eNB identification information and the wireless network temporary identification information temporarily allocated by the corresponding eNB.

4) Store CU Identification Information and Wireless Network Temporary Identification Information as UE Identification Information When a CU within the network can be uniquely identified through CU identification information, the UE may be uniquely identified through a combination of the CU identification information and the wireless network temporary identification information temporarily allocated by the corresponding CU.

Method of Transmitting Signaling or Uplink Data of UE in Light Connection State

The UE in the light connection state may transition to the RRC-connected state and transmit and receive data. To this end, when the transition to the RRC-connected state is triggered, the UE in the light connection state performs an operation for the transition to the RRC-connected state.

For example, when the UE in the light connection state has uplink data or signaling (MO data or MO signaling) or when the UE in the light connection state receives paging, the UE may switch to the RRC connection state in the corresponding cell (or resume the RRC connection or initiate the transition to the RRC-connected state, hereinafter, referred to as the transition to the RRC-connected state in the light connection state for convenience of description).

Hereinafter, a detailed procedure of transitioning of the UE to the RRC-connected state will be described through various embodiments.

1) Embodiment Using RRC Connection Request Message

The UE may transmit an RRC Connection request message to the eNB through a common control channel (for example, CCCH).

When the transition from the light connection state to the RRC-connected state is triggered by a higher layer and when the higher layer provides an S-TMSI, a value received from the higher layer may be set as a UE-Identity.

When the transition from the light connection state to the RRC-connected state is triggered within AS, a stored value received from the eNB may be set as the UE identity. This will be described below.

When the higher layer triggers the transition from the light connection state to the RRC-connected state, an establishment cause value corresponding to information received from the higher layer may be set. The establishment cause value may refer to information indicating that a trigger cause of the transition to the RRC-connected state is generated. For example, the UE may add information indicating the transition to the RRC-connected state in the light connection state. In another example, the UE may add information indicating the transition to the RRC-connected state in the light connection state to an RRC Connection setup complete message.

When the transition from the light connection state to the RRC-connected state is triggered within AS, a value indicating the transition from the light connection state to the RRC-connected state may be set as the establishment cause value.

2) Embodiment Using RRC Connection Re-Establishment Request Message

The UE may transmit an RRC Connection reconfiguration request message to the eNB through a common control channel (for example, CCCH).

The UE sets a C-RNTI used within a cell indicating the light connection state as a C-RNTI.

The UE sets a physical cell identifier within the cell indicating the light connection state as a phyCellId.

The UE sets a MAC-I as calculated MAC-I 16 least significant bits.

The UE may set a value indicating the transition from the light connection state to the RRC-connected state as a reestablishment cause.

In another example, when the transition to the RRC-connected state is triggered in the light connection state within AS, a stored value received from the eNB may be set as the UE identity. This will be described below.

3) Embodiment Using RRC Connection Resume Request Message

The UE may transmit an RRC Connection resume request message to the eNB through a common control channel (for example, CCCH).

The stored value received from the eNB may be set as the UE identity. This will be described below.

When the transition from the light connection state to the RRC-connected state is triggered by the higher layer, an establishment cause value corresponding to information received from the higher layer may be set. The establishment cause value may include trigger cause information about the transition to the RRC-connected state. For example, the establishment cause value may include information indicating one of paging message reception, outgoing data trigger, and outgoing signaling trigger. For example, the UE may add information indicating the transition to the RRC-connected state in the light connection state. In another example, the UE may add information indicating the transition from the light connection state to the RRC-connected state to an RRC Connection resume complete message.

When the transition from the light connection state to the RRC-connected state is triggered within AS, a value indicating the transition from the light connection state to the connected state may be set as the establishment cause value.

The UE sets a MAC-I as calculated MAC-I 16 least significant bits.

4) Embodiment Using New RRC Connection Request Message Using Common Control Channel The UE may transmit a new RRC Connection request message to the eNB through a common control channel (for example, CCCH).

The stored value received from the eNB may be set as the UE identity. This will be described below.

When the transition from the light connection state to the RRC-connected state is triggered by the higher layer, an establishment cause value corresponding to information received from the higher layer may be set. For example, the UE may add information indicating the transition to the RRC-connected state in the light connection state. In another example, the UE may add information indicating the transition from the light connection state to the RRC-connected state to an RRC Connection resume complete message.

When the transition from the light connection state to the RRC-connected state is triggered within AS, a value indicating the light connection transition may be set as the establishment cause value.

The UE sets a MAC-I as calculated MAC-I 16 least significant bits.

As described above, according to the present embodiments, it is possible to expend less processing effort on a UE that frequently performs connection setup and to more efficiently use the capacity of a network node. Further, there is an effect of reducing UE battery consumption.

Hereinafter, configurations of the UE and the eNB that may perform some or all of the present embodiments described with reference to FIG. 1 to FIG. 5 will be described through the drawings.

Figure 6:
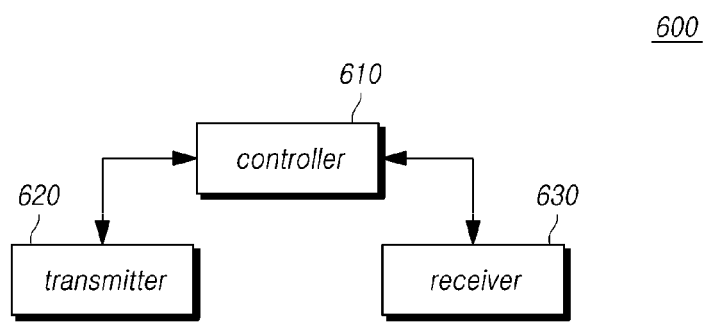
FIG. 6 illustrates a UE configuration according to another embodiment.

FIG. 6 illustrates a UE configuration according to another embodiment.

Referring to FIG. 6, a UE 600 changing a connection state may include a transmitter 620 for transmitting UE capability information indicating a light connection to an eNB, a receiver 630 for receiving an RRC message including indication information indicating a state change to a light connection state from the eNB, and a controller 610 for performing an operation of changing the connection station of the UE from the RRC connected state to the light connection state based on the indication information.

For example, the transmitter 620 may transmit information on whether the corresponding UE supports the light connection state to the eNB. That is, the transmitter 620 may transmit information on support of a RRC connection state, an RRC idle state, and a light connection state to the eNB.

For example, the UE capability information may be transmitted to the eNB or the core network through AS capability or NAS capability. In another example, the UE capability information may be included in UE radio access capability or UE core network capability. The transmitter 620 may transmit the UE capability information to the eNB through RRC signaling.

The light connection state refers to the state in which a connection between the eNB and the core network for the UE is maintained but all Signaling Radio Bearers (SRBs) and Data Radio Bearers (DRBs) of the UE are suspended. That is, the light connection state may correspond to the state in which the RRC state and the ECM state do not match.

Further, the transmitter 620 may transmit an RRC connection resume request message that makes a request for changing the connection state of the UE from the light connection state to the RRC-connected state to the eNB. The RRC connection resume request message may include cause information indicating a trigger cause of the state change to the RRC-connected state. The state change into the RRC-connected state may be triggered by one operation of paging message reception, outgoing data trigger, and outgoing signaling trigger.

The receiver 630 may receive indication information that indicates the state transition to the light connection state from the eNB through an RRC message. For example, the RRC message may be an RRC connection reconfiguration message or an RRC connection release message. Alternatively, the indication information may be included in a newly defined RRC message.

When indication information indicating the state change to the light connection state is received from the eNB, the controller 610 suspends all SRBs and DRBs for the corresponding eNB. However, unlike the RRC idle state, the controller 610 may store a UE context. In this case, the eNB also stores a UE context for the corresponding UE. Accordingly, when the light connection state of the UE is transited to the RRC-connected state, the UE and the eNB may use the stored UE context again to perform quick data transmission/reception.

In addition, when the UE in the light connection state moves, the controller 610 may perform a cell re-selection operation rather than a handover.

Furthermore, the receiver 630 may receive downlink control information, data, and messages from the eNB through corresponding channels. Further, the controller 610 controls the general operation of the UE 600 related to the mutual transition operation between the light connection state and the RRC connection state described above. The transmitter 620 transmits uplink control information, data, and messages to the eNB through corresponding channels.

Figure 7:
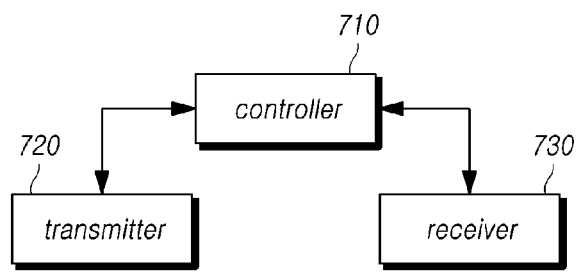
FIG. 7 illustrates an eNB configuration according to another embodiment.

FIG. 7 illustrates an eNB configuration according to another embodiment.

Referring to FIG. 7, an eNB 700 changing a connection state of a UE may include a receiver 730 for receiving UE capability information indicating that the UE supports a light connection state from the UE, a transmitter 720 for transmitting an RRC message including an indication message indicating a state change to the light connection state to the eNB, and a controller 710 for changing the connection state with the UE from the RRC-connected state to the light connection state. The light connection state refers to the state in which a connection state between the eNB and the core network for the UE is maintained but all SRBs and DRBs of the UE are suspended.

The controller 710 may receive the UE capability information from the UE, to identify that the corresponding UE supports an RRC-connected state, an RRC idle state, and a light connection state.

For example, the UE capability information may be transmitted to the eNB or the core network through AS capability or NAS capability. In another example, the UE capability information may be included in UE radio access capability or UE core network capability. The receiver 730 may receive the UE capability information through RRC signaling.

The transmitter 720 may transmit an RRC message to make the UE transition to the light connection state. For example, the RRC message may be an RRC connection reconfiguration message or an RRC connection release message. Alternatively, the indication information may be included in a newly defined RRC message.

When the UE transitions to the light connection state, the controller 710 may suspend all the SRBs and the DRBs for the corresponding UE. However, unlike the RRC idle state, the controller 710 may store a UE context of the corresponding UE. Accordingly, when the light connection state of the UE is transited to the RRC-connected state, the UE and the eNB may use the stored UE context again to perform quick data transmission/reception. Further, the controller 710 may control the transition of the UE in the light connection state to the RRC-connected state.

Meanwhile, the receiver 730 may receive an RRC connection resume request message that makes a request for the state change from the light connection state to the RRC-connected state from the UE. For example, when the transition of the UE in the light connection state to the RRC-connected state is triggered, the controller 710 may receive the RRC connection resume request message and perform an RRC connection state transition operation of the corresponding UE. For example, the state change into the RRC-connected state may be triggered by one operation of paging message reception of the UE, outgoing date trigger, and outgoing signaling trigger. More specifically, when the paging message for the UE in the light connection state is transmitted, the UE may perform the transition operation to the RRC-connected state. Alternatively, when outgoing data which the UE in the light connection state will transmit to the eNB is triggered, the UE may perform the transition operation to the RRC-connected state. Alternatively, when outgoing signaling which the UE in the light connection state will transmit to the eNB is triggered, the UE may perform the transition operation to the RRC-connected state. Meanwhile, the RRC connection resume request message may include cause information indicating the trigger cause of the state change to the RRC-connected state. The cause information indicating the trigger cause may include information on whether the cause is the above-described paging, outgoing data trigger, or outgoing signaling trigger.

In addition, the controller 710 controls the general operation of the eNB 700 to control the transition operation to the light connection state of the UE, which is required for performing the present embodiments, and the transition operation from the light connection state to the RRC connection state.

Further, the transmitter 720 and the receiver 730 are used for transmitting/receiving signals, messages, and data required for implementing the above-described present disclosure to/from the UE.

The standard contents or standard documents used in the above-described embodiment are omitted to make the description of this specification brief, and constitute a part of this specification. Accordingly, it should be construed that adding some of the standard contents or the standard documents in this specification or writing them in the claims falls within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

What is claimed is:

1. A method of changing a connection state by a user equipment (UE), the method comprising:

transmitting UE capability information indicating that the UE supports a light connection to a base station;

receiving a Radio Resource Control (RRC) message including indication information that indicates a state change to a light connection state from the base station;

changing a connection state of the UE from an RRC-connected state to the light connection state based on the indication information; and transmitting, by the UE to the base station, an RRC connection resume request message that makes a request for changing the connection state of the UE from the light connection state to the RRC-connected state, when a transition of the UE in the light connection state to the RRC-connected state is triggered, wherein the light connection state corresponds to a state in which a connection state between the base station and a core network for the UE is maintained without core network signaling for the state change to the light connection state but all Signaling Radio Bearers (SRBs) and Data Radio Bearers (DRBs) of the UE are suspended, wherein the RRC connection resume request message includes trigger cause information indicating a trigger cause of a state change to the RRC-connected state, and wherein when the state change to from the light connection state to the RRC-connected state is triggered by the paging message reception, if the paging message includes a UE identifier allocated by the base station, the RRC connection resume request message is triggered within an access stratum (AS) layer.

2. The method of claim 1, wherein the RRC message is an RRC connection reconfiguration message or an RRC connection release message.

3. The method of claim 1, wherein the changing of the connection state of the UE comprises suspending all SRBs and DRBs of the UE but storing a UE context.

4. The method of claim 1, wherein the state change to the RRC-connected state is triggered by one operation of paging message reception, outgoing data trigger, and outgoing signaling trigger.

5. A method of changing a connection state of a user equipment (UE) by a base station, the method comprising:

receiving UE capability information indicating that the UE supports a light connection state from the UE;

transmitting a Radio Resource Control (RRC) message including indication information that indicates a state change to a light connection state to the UE;

changing a connection state with the UE from an RRC-connected state to the light connection state; and receiving, by the base station from the UE, an RRC connection resume request message that makes a request for changing the connection state from the light connection state to the RRC-connected state, wherein the light connection state corresponds to a state in which a connection state between the base station and a core network for the UE is maintained without core network signaling for the state change to the light connection state but all Signaling Radio Bearers (SRBs) and Data Radio Bearers (DRBs) are suspended; and wherein the RRC connection resume request message includes trigger cause information indicating a trigger cause of a state change to the RRC-connected state wherein when the state change from the light connection state to the RRC-connected state is triggered by the paging message reception in the UE, if the paging message includes a UE identifier allocated by the base station, the RRC connection resume request message is triggered within an access stratum (AS) layer.

6. The method of claim 5, wherein the changing of the connection state with the UE from an RRC-connected state to the light connection state comprises storing a UE context of the UE but suspending all SRBs and DRBs with the UE.

7. The method of claim 5, wherein the RRC message is an RRC connection reconfiguration message or an RRC connection release message.

8. A user equipment (UE) changing a connection state, the UE comprising:

a transmitter configured to transmit UE capability information indicating support of a light connection to a base station;

a receiver configured to receive a Radio Resource Control (RRC) including indication information indicating a state change to a light connection state from the base station; and a controller configured to change a connection state of the UE from an RRC-connected state to the light connection state, wherein the light connection state corresponds to a state in which a connection state between the base station and a core network for the UE is maintained without core network signaling for the state change to the light connection state but all Signaling Radio Bearers (SRBs) and Data Radio Bearers (DRBs) of the UE are suspended; and wherein the transmitter further transmits, to the base station, an RRC connection resume request message that makes a request for changing the connection state of the UE from the light connection state to the RRC-connected state, when a transition of the UE in the light connection state to the RRC-connected state is triggered, where the RRC connection resume request message includes trigger cause information indicating a trigger cause of a state change to the RRC-connected state, and wherein when the state change from the light connection state to the RRC-connected state is triggered by the paging message reception, if the paging message includes a UE identifier allocated by the base station, the RRC connection resume request message is triggered within an access stratum (AS) layer.

9. The UE of claim 8, wherein the RRC message is an RRC connection reconfiguration message or an RRC connection release message.

10. The UE of claim 8, wherein the controller suspends all SRBs and DRBs of the UE but stores a UE context.

11. The UE of claim 8, wherein the state change to the RRC-connected state is triggered by one operation of paging message reception, outgoing data trigger, and outgoing signaling trigger.

* * * * *